Patented Dec. 13, 1949

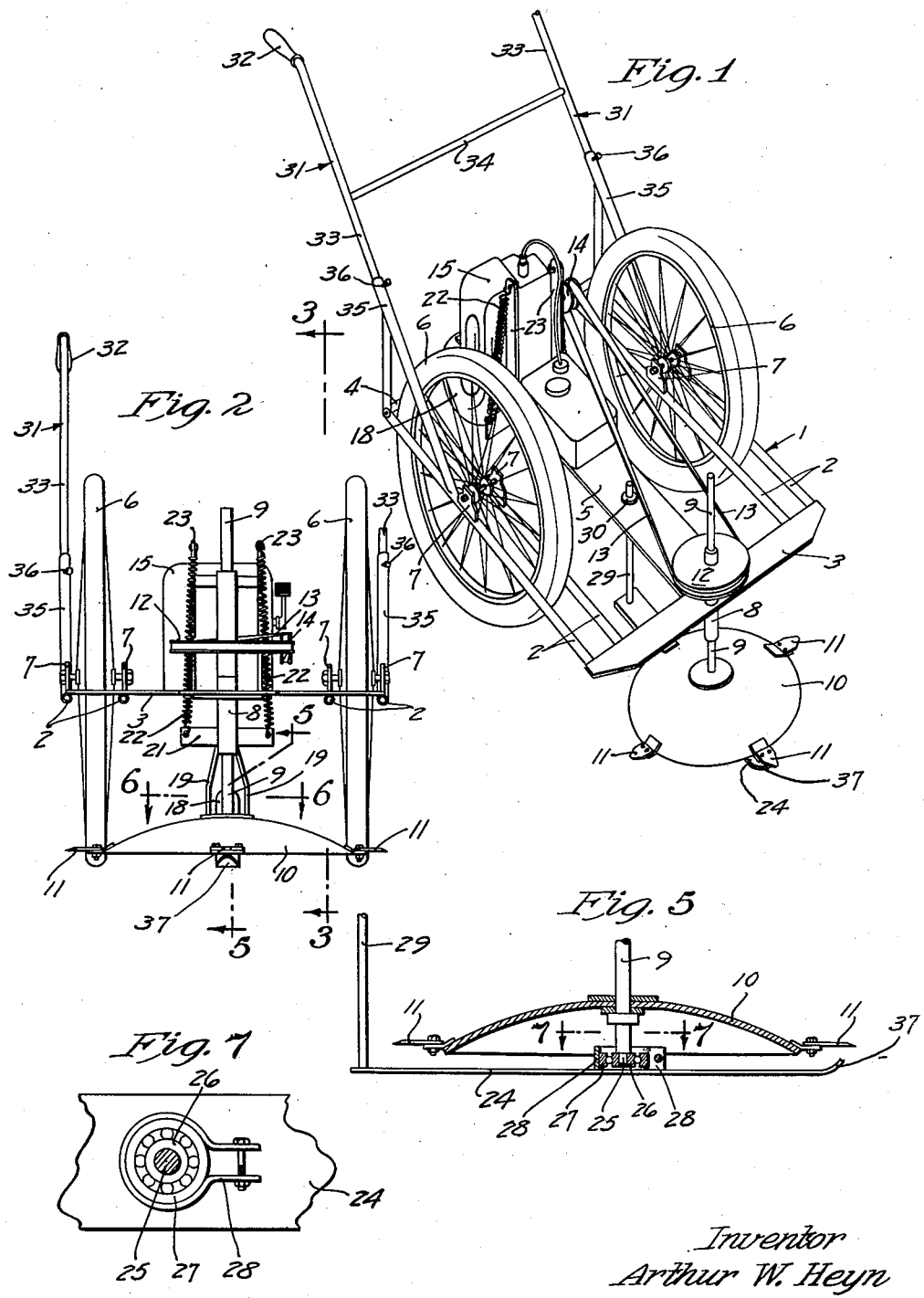

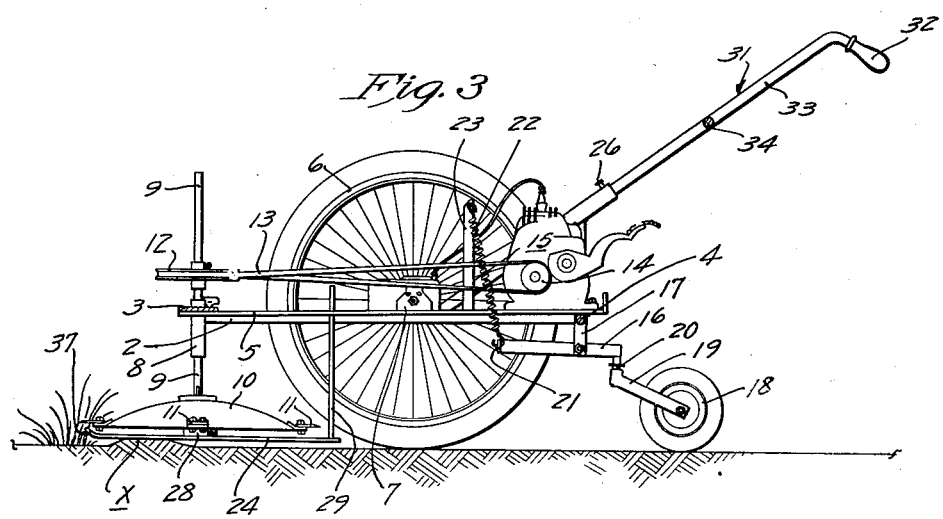
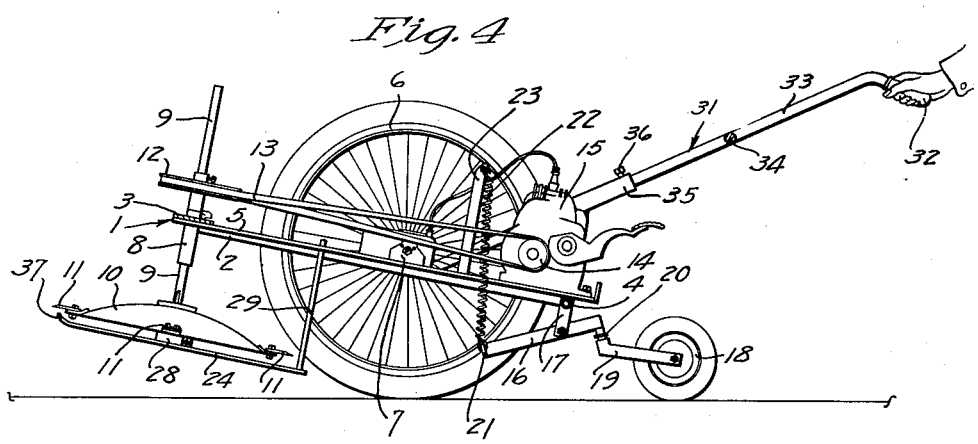
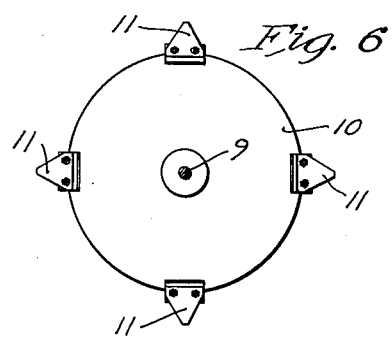

2,490,870

UNITED STATES PATENT OFFICE 2,490,870

POWER MOWER

Arthur W. Heyn, Byron, Minn.

Application October 31, 1947, Serial No. 783,286

3 Claims. (Cl. 56—25.4)

My invention relates to improvements in mowing machines and, more particularly, to mowing machines of the type, wherein the cutting is effected by means of horizontally-disposed cutting knives or blades.

The principal object of my invention is the provision of means for maintaining the cutter blades in uniformly spaced relation to the ground when the same is propelled over rough terrain.

A still further object of my invention is the provision of a mowing machine, which is relatively inexpensive to manufacture, which is rugged in construction, and which has great cutting power.

The above and still further objects of my invention will become obvious from the following detailed specification, appended claims, and attached drawings.

Referring to the drawings, wherein like characters indicate like parts throughout the several views:

Fig. 1 is a perspective view of my novel mowing machine;

Fig. 2 is a front elevation with some parts being broken away;

Fig. 3 is a vertical section taken substantially on the line 3—3 of Fig. 2;

Fig. 4 is a view corresponding to Fig. 3, but showing a slightly different position of some of the parts;

Fig. 5 is a fragmentary section taken substantially on the line 5—5 of Fig. 2;

Fig. 6 is a view partly in section and partly in plane taken substantially on the line 6—6 of Fig. 2; and Fig. 7 is a fragmentary section taken on the line 7—7 of Fig. 5.

Referring with greater particularity to the drawings, the numeral 1 indicates, in its entirety, a rectangular frame made up of laterally-spaced pairs of parallel side frame members 2 joined at their front ends by a front frame member 3 in the nature of a flat bar and adjacent their rear ends by a cross member 4. A mounting plate 5 extends longitudinally of the frame 1 intermediate the pairs of side frame members 2. The frame is supported intermediate its ends by a pair of wheels 6 journalled in bearing plates 7 secured to the side frame members 2 (see particularly Figs. 1 and 2). The wheels 6 are preferably rubber tire equipped and of the nature commonly used on bicycles or the like.

Mounted for compound axial sliding and rotary movements in a tubular bearing member 8 secured to the central portion of the front frame member 3, is a substantially vertically-disposed shaft 9. A cutter head 10 is secured to the shaft 9, adjacent its lower end, and is equipped with a plurality of laterally-projecting, circumferentially-spaced cutter blades 11. Preferably, and as shown, the cutter head 10 is in the nature of an upwardly convex disk. A pulley 12 is removably secured to the upper portion of the shaft 9 and when secured in position, as shown in Fig. 4, abuts against the bearing member 8 and limits the axially downwardly sliding movements of the shaft 9. An endless belt 13, preferably of the V type, runs over the pulley 12 and over another pulley 14 fast on the drive shaft of an internal combustion engine 15, which is secured to the mounting plate 5, preferably and as shown, in the rear thereof.

A normally horizontally-disposed lever 16 is centrally pivotally mounted to a bracket 17, which depends from the center of cross bar 4. A caster wheel 18 is journalled to the end of a leg 19, which is connected for pivotal movements about a vertical axis to the rear end of the lever 16. As indicated at 20, to the front end of the lever 16 is secured a relatively short cross bar 21. A pair of coil extension springs 22 have their lower ends secured to opposite ends of the cross bar 21 and their upper ends to the upper open ends of U-shaped bracket 23. The bracket 23 is secured at its lower intermediate portion to the mounting plate 5 intermediate its ends. As will be seen, particularly by reference to Figs. 1 and 2, lever 16, in cooperation with caster wheel 18 and springs 22, biases the cutter head 10 towards engagement with the ground.

Maintaining the cutter head 10 in spaced relation to the ground is an elongated ground-engaging skid or ski 24 which rotatively supports the extreme lower end of shaft 9. As shown, particularly by reference to Figs. 5 and 6, the reduced end 25 of the shaft 9 is made fast in the inner race 26 of a bearing member, whereas the outer race 27 thereof is rigidly held in a clamping member 28 which, in turn, is rigidly secured to the top of the skid 24 at its central portion. To prevent rotation of the skid 24 with respect to the frame 1, I provide the rear end of the skid 24 with an upstanding arm or rod 29, the upper end of which is slidably mounted in a bearing 30 in the mounting plate 5.

Extending upwardly and rearwardly from the side members 2 are spaced handle bars 31 which are provided at their extreme outer ends with handle grips 32. Preferably, and as shown, the handle bars are made out of telescoping outer members 33 which are held together by a cross member 34 and tubular inner members 35, in which set screws 36 or the like are secured. When it is desired to store or ship the device, the outer handle members 33 are removed. Similarly, when it is desired to cover the fly wheel 10 with a cow catcher or like safety device, this may be done by securing the same to the front of the frame in any suitable manner.

From the above, it should be obvious that, as my novel mower is pushed over the ground, the lever 16, in cooperation with the caster wheel 18 and the springs 22, biases the cutter head 10 towards the ground, as indicated in Fig. 3. The ski or skid 24, however, the front end of which is turned up as indicated at 37, to facilitate sliding over rough terrain, maintains the cutter head in uniformly spaced relation to the ground, irrespective of the roughness of the terrain. Thus, as also indicated in Fig. 3, as the ski or skid 24 climbs up upon a ridge or other obstruction, there indicated by the letter x, the shaft 9, against the action of gravity, will be pushed upwardly in the bearing 8, with the pulley 12 being elevated therefrom. At the same time, as also indicated by Fig. 3, the rod or arm 29 slides upwardly through the bearing 30. This floating cutter head is extremely important in that it greatly prolongs the life of the cutter blades 11 and allows them to cut grass or the like at a uniform height, irrespective of the terrain.

It will be observed that the upturned end 37 of the skid 24 underlies the area traversed by the cutter blades 11 and is positioned to engage the ridge or obstruction x before the blades 11 come in contact therewith. This position of the end 37, however, does not interfere with the cutting action of the blades 11 on the grass directly in front of the skid 24.

My invention has been thoroughly tried and found to be completely satisfactory for the accomplishment of the above objects; and while I have disclosed a commercial form of my invention, it should be obvious that the same is capable of modification without departure from the scope of the appended claims.

What I claim is:

1. In a device of the class described, a frame, a pair of wheels secured one each to opposite sides of said frame intermediate the ends thereof, a motor carried by said frame, a vertically-disposed drive shaft mounted in bearings on the front end of said frame for compound rotary and limited axial sliding movements, a cutter head on said shaft adjacent the lower end, flexible driving connections between said motor and said drive shaft, means limiting downward sliding movements of the shaft, an elongated ground-engaging skid carried by the drive shaft and underlying said cutter head, and means slidably associated with the frame for preventing rotation of the skid and maintaining the same in parallel alignment with said wheels.

2. In a device of the class described, a rectangular frame, a wheel secured to opposite sides of said frame intermediate the ends thereof, a motor secured to the frame adjacent the rear end thereof, a vertically-disposed drive shaft journalled to the frame adjacent the front end thereof, driving connections between said motor and said drive shaft, an elongated ground-engaging skid rotatively supporting the extreme lower end of said drive shaft, a cutter head secured to the lower end of said drive shaft, an elongated ground-engaging skid rotatively supported on the extreme lower end of said drive shaft in spaced relation to said cutter head, said skid projecting forwardly of the drive shaft a distance slightly less than the radius of said cutter head, and an upstanding arm on the extreme rear end of said skid, said arm projecting upwardly through an opening in the frame and preventing rotation of said skid with respect to said shaft but permitting axial movements of the shaft and skid with respect to said frame.

3. The structure defined in claim 2 in further combination with adjustable means limiting axial slidable movements of said shaft with respect to said frame.

ARTHUR W. HEYN.

REFERENCES CITED

The following references are of record in the file of this patent:

UNITED STATES PATENTS

| Number | Name | Date |
|---|---|---|
| 1,823,215 | Seal | Sept. 15, 1931 |
| 2,200,368 | Iverson | May 14, 1940 |
| 2,225,139 | Urschel | Dec. 17, 1940 |
| 2,329,185 | Coddington | Sept. 14, 1943 |